United States Patent [19]
Buchele

[11] 3,881,347
[45] May 6, 1975

[54] STRAIN-GAUGE, BRUSHLESS TORQUE METER

[75] Inventor: Wesley F. Buchele, Ames, Iowa

[73] Assignee: Iowa State University Research Foundation, Inc., Ames, Iowa

[22] Filed: Aug. 22, 1973

[21] Appl. No.: 390,602

[52] U.S. Cl. ............................................ 73/136 R
[51] Int. Cl. ............................................. G01l 3/14
[58] Field of Search ......................... 73/136 R, 140

[56] References Cited
UNITED STATES PATENTS

| | | | |
|---|---|---|---|
| 2,061,896 | 11/1936 | Chilton | 73/136 R |
| 2,718,782 | 9/1955 | Steinbruegge et al. | 73/136 R |
| 3,389,432 | 6/1968 | Griedsheimer et al. | 73/141 A UX |

FOREIGN PATENTS OR APPLICATIONS

| | | | |
|---|---|---|---|
| 250,515 | 7/1970 | U.S.S.R. | 73/136 R |

*Primary Examiner*—Charles A. Ruehl
*Attorney, Agent, or Firm*—Zarley, McKee, Thomte & Voorhees

[57] ABSTRACT

A torque meter comprising hollow-keyed, input and output female shafts adapted to receive the male shafts of the power source and machine respectively. Each shaft has a circular flange whose face is perpendicular to the center line of the shafts. Each flange has a plurality of equally spaced cylindrical recesses machined into the inside face thereto adapted to receive conical inserts therein. Balls are contained by the conical inserts and transmit the rotational movement from the input to the output shaft. A stationary housing extends around the input and output shaft and has a transducer shell secured thereto. When force is applied to the input shaft to cause movement, the balls encounter torsional resistance which causes the balls to roll up the ramps of the conical seat inserts to separate the two torque flanges. The force transmitted through the balls causes rotation to the output shaft and produces tension to the stationary transducer shell. The stationary transducer shell is instrumented with semi-conductor strain gauges.

9 Claims, 4 Drawing Figures

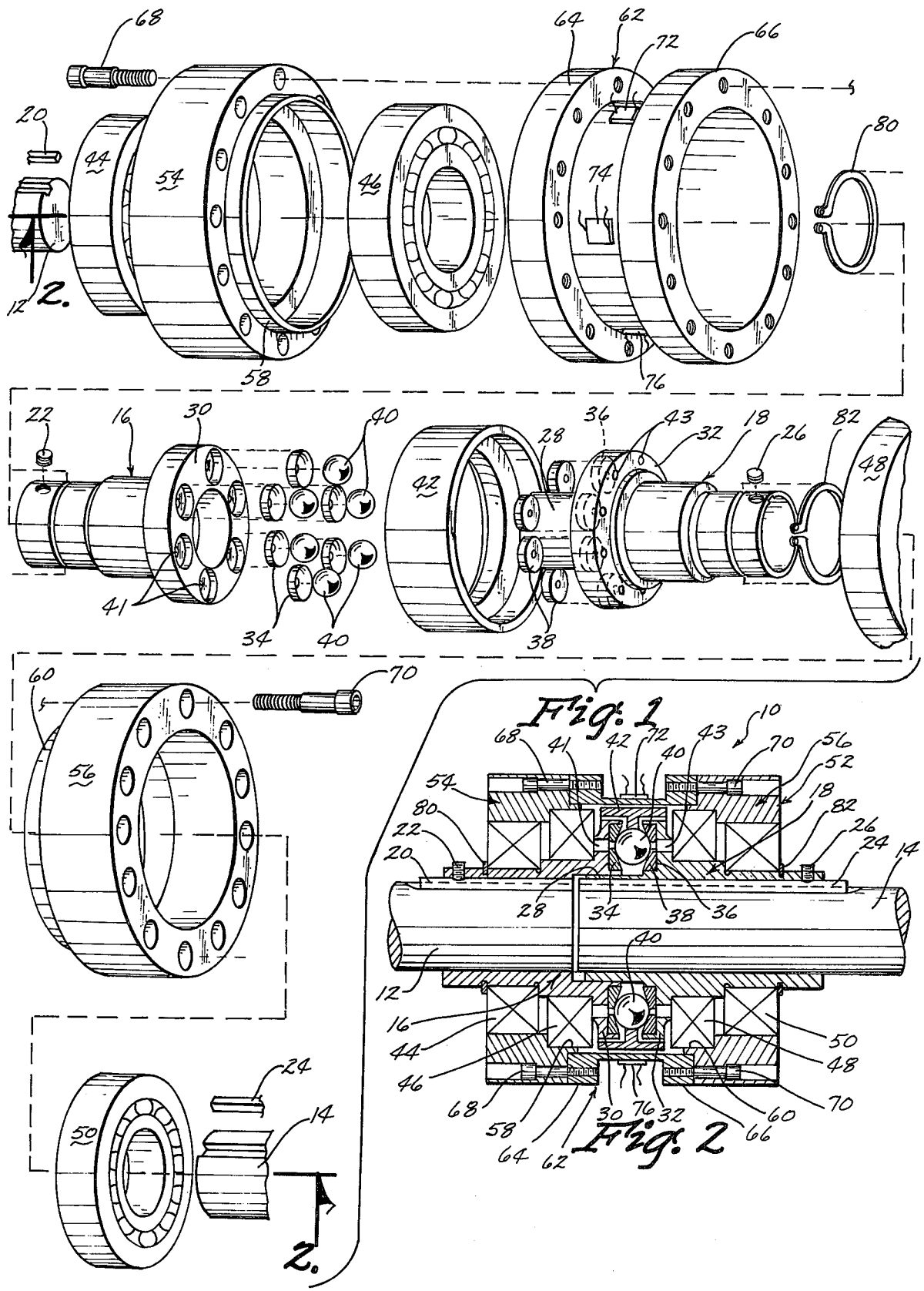

3,881,347

STRAIN-GAUGE, BRUSHLESS TORQUE METER

BACKGROUND OF THE INVENTION

Torque measurement instruments are used extensively on agricultural machinery. Most of the commercial torque meters have limited application because they are designed to work in a specific range for the required precision and are usually quite expensive. A large majority of conventional torque meters include commutators and brushes. Frequently the brushes do not function properly due to dust, moisture, acid, etc., which creates considerable difficulty. Further, the conventional torque meters ordinarily require that the power line shaft be extensively modified or torn down to permit the installation of the torque meter.

Therefore, it is a principal object of the invention to provide an improved torque meter.

A further object of the invention is to provide a strain-gauge torque meter which eliminates commutators and brushes.

A further object of the invention is to provide a torque meter employing a force-balance system.

A further object of the invention is to provide a torque meter which permits full scale reading of recording systems at any given torque range through the use of changable conical seat inserts and semiconductor strain gauges.

A further object of the invention is to provide a torque meter which is not affected by dust, acid, humidity, etc.

A still further object of the invention is to provide a torque meter which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is an exploded perspective view of the torque meter of this invention:

FIG. 2 is a sectional view seen on lines 2 — 2 of FIG. 1:

DESCRIPTION OF THE PREFERRED EMBODIMENT

Figures 3, 4:
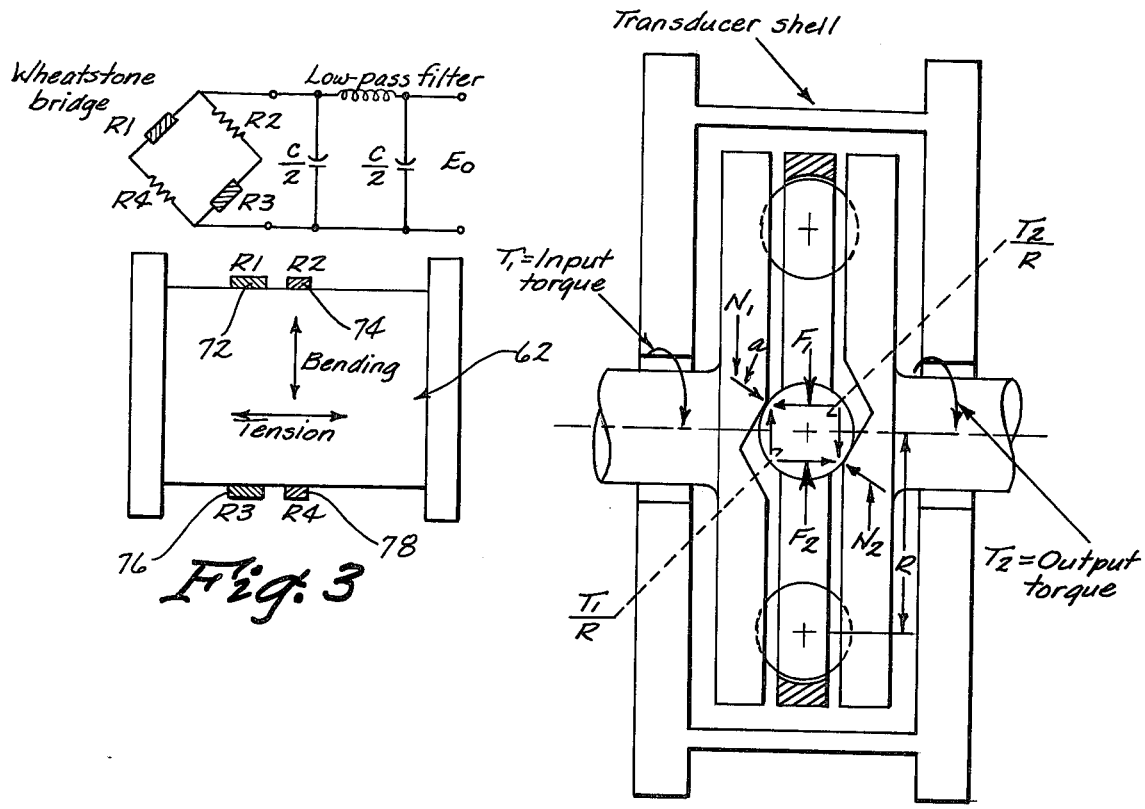
FIG. 3 is a schematic diagram of a strain gauge circuitry.
FIG. 4 is a schematic diagram of the force balance system of the torque meter of this invention.

The torque meter of this invention is referred to generally by the reference numeral 10 and is designed to be installed on the male shafts 12 and 14 of the power source and machine respectively. The numerals 16 and 18 refer to two almost identical, hollow-keyed female input and output shafts respectively. Key 20 is positioned between the shaft 12 and the shaft 16 while the numeral 22 refers to a set screw extending through the outer end of the shaft 16 for engagement with the key 20. Likewise, the numeral 24 refers to a key which is positioned between the shaft 14 and the shaft 18. Set screw 26 threadably extends through the outer end of the shaft 18 for engagement with the key 24.

As seen in FIG. 2, shaft 18 is provided with a sleeve-like dust seal 28 which is received by the inner end of the shaft 16. Shafts 16 and 18 are provided with torque flanges whose faces are perpendicular to the center line of the shafts. Flange 30 is provided with six equally spaced cylindrical recesses which are machined into the inside face thereof adapted to receive the conical inserts 34. Flange 32 is provided with six equally spaced cylindrical recesses 36 machined into the inside face thereof for receiving the conical inserts 38. Balls 40 are received by the opposing inserts 34 and 38 as seen in the drawings. A plurality of punch-out holes 41 and 43 are provided in flanges 30 and 32 respectively for punching out the inserts 34 and 38.

The numeral 42 refers to a ball retainer ring having a T-shaped cross section which is adapted to prevent radial movement of the balls 40. The numerals 44, 46, 48 and 50 refer to bearings which are positioned between the shafts and the stationary housing 52. Housing 52 is comprised of housing members 54 and 56 and hollow transducer shell 62. Housing members 54 and 56 have inwardly extending shoulders 58 and 60 respectively. Hollow transducer shell 62 has flanges 64 and 66 which are secured to the housing members 54 and 56 respectively by the cap screws 68 and 70 respectively as seen in the drawings. Transducer shell 62 is provided with four semi-conductor strain gauges referred to by the reference numerals 72, 74, 76 and 78. Snap rings 80 and 82 are provided to maintain the housing in position with respect to the shafts 16 and 18 as illustrated in FIG. 2. It can be appreciated from the foregoing that mounting female shafts 16, 18 to male shafts 12, 14 by keys 20, 24 and set screws 22, 26 permits relative axial displacement between shafts 16 and 12 and/or between shafts 18 and 14.

In operation, the balls 40 encounter torsional resistance when torque is applied to the shaft 16 by the shaft 12. This causes the balls 40 to roll up the ramps of the conical seat inserts 34 and 38 to separate the flanges 30 and 32. The force transmitted through the balls causes or tends to cause rotation of output shaft 18 and produces tension to the stationary transducer shell 62. As previously stated, the stationary shell 62 is instrumented with semi-conductors strain gauges. The bridge circuit is illustrated in FIG. 3. The tension produces alike sign strains on gauges R1 and R2 located on the shell, and unbalances the bridge in proportion to the sum of the resistance changes. If the shell has any tendency to bend, however, gauges R1 and R3 would be strained equally in opposite directions, and the resulting resistance changes would not effect the state of bridge balance. R2 and R4 are in Poisson arrangement for temperature compensation and slightly increased output signal.

In transmitting torque, the balls 40 continue to move axially until their axial force component on the input shaft is balanced by the opposite component on the output shaft. There are three types of forces on the balls: first, the tangential force, which is the torque transmitted by the shaft; second, the axial force, which is directly proportional to the torque transmitted; and third, the centrifugal force due to rotation of the shaft. The axial force induces tension in the strain-gauged transducer shell proportional to torque.

With reference to FIG. 4, the following analysis is obtained. Let:

$N_1 = N_2$ = Equilibrium normal force acting on balls $a = 30°$, angle the normal force makes with horizontal; (Parallel to shaft center line), i.e., complementary to half the included angle of conical seat (120°)

$F_1 = F_2 = F_A$ = Axial force
$R$ = Ball pitch radius = 2.375 in
$T_1 = T_2 = T$ = Torque transmitted
$F_T = T_1/R = T_2/R = T/R$ = Tangential force then:
$F_T/F_N = \sin a$
$F_A/F_N = \cos a$ Therefore:
$F_T = F_A \tan a$
$T = R \cdot F_A \tan a$ But for each conical insert, $R \tan a$ = constant = $K$ therefore:
$T = X \cdot F_A$ or torque transmitted is directly proportional to the axial force. The centrifugal force is prevented from influencing the magnitude of the reading by the steel retaining ring (FIG. 2) that prevents movement in a radial direction.

The brushless torque meter described herein is easily adaptable for any kind of shaft. The torque meter may be adapted for various sizes of shafts by simply inserting bushings between the shafts 12, 14 and the shafts 16 and 18. Dust, moisture or atmospheric conditions do not effect the electrical signal in the torque meter 10. The range and/or sensitivity of the torque meter may be changed by replacing the conical inserts 34 and 38 by another set of inserts with the appropriate seat angle for the required working range. The larger the included seat angle, the lower the range of the torque meter. The torque meter disclosed herein is easily assembled on the shafts 12 and 14 and occupies very little space. It is simply necessary to separate the shafts 12 and 14 to insert the torque meter thereon. Thus it can be seen that an improved torque meter has been described which accomplishes at least all of its stated objectives.

I claim:

1. A strain-gauge torque meter comprising, a female input shaft means, means therewith, connecting said input shaft means to
   a power source shaft for rotation threwith,
   a female output shaft means, means for connecting said output shaft means to a machine shaft for rotation therewith, said means for connecting enabling relative axial displacement of said input and output shaft means,
   said power source shaft and machine shaft being in-line and spaced apart, said input and output shaft means having first and second spaced apart flanges thereon respectively having a face substantially perpendicular to the center line of said power source shaft and said machine shaft,
   said flanges having a plurality of spaced apart conical seats provided in the faces thereof arranged in an opposing manner,
   a ball in each of said opposing conical seats,
   said balls transmitting rotational movement from said input shaft means to said output shaft means,
   a stationary transducer shell means extending around said input and output shaft means,
   said balls tending to roll up the conical seats to separate said first and second flanges to create tension in said shell when rotational force is applied to said input shaft means,
   said transducer shell means being instrumented with strain gauges which sense tension proportional to torque imposed in said transducer shell when said rotational force is applied to said input shaft means.

2. The torque meter of claim 1 wherein a retainer ring extends around said flanges for preventing radial movement of said balls.

3. The torque meter of claim 2 wherein said retainer ring has a T-shaped cross-section.

4. The torque meter of claim 1 wherein said flanges have cylindrical recesses formed in the faces thereof, said conical seats comprising an insert positioned in each of said recesses, each of said inserts having a conical ramp which partially receives one of said balls.

5. The torque meter of claim 4 wherein said inserts are removably secured to said flanges.

6. The torque meter of claim 5 wherein said flanges have punch-out holes formed therein which communicate with said recesses for removing the inserts therefrom.

7. The torque meter of claim 1 wherein a bearing means is positioned between said input-output shaft means and said shell.

8. The torque meter of claim 1 wherein said strain gauges are semiconductor strain gauges.

9. The torque meter of claim 1 wherein said power source shaft and said machine shaft are in-line and closely adjacent each other, said torque meter being operatively secured to said power source shaft and said machine shaft so that the substantial separation thereof is not required.

* * * * *